United States Patent
Hayashi

(10) Patent No.: US 9,832,335 B2
(45) Date of Patent: Nov. 28, 2017

(54) IMAGE FORMING APPARATUS WITH POWER SAVING MODE

(71) Applicant: CANON KABUSHIKI KAISHA, Tokyo (JP)

(72) Inventor: Toshio Hayashi, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/379,535

(22) Filed: Dec. 15, 2016

(65) Prior Publication Data

US 2017/0187903 A1 Jun. 29, 2017

(30) Foreign Application Priority Data

Dec. 24, 2015 (JP) ................................. 2015-251621

(51) Int. Cl.
  *G06K 15/00* (2006.01)
  *H04N 1/00* (2006.01)

(52) U.S. Cl.
  CPC ..... *H04N 1/00904* (2013.01); *H04N 1/00891* (2013.01); *H04N 1/00896* (2013.01); *H04N 1/00933* (2013.01); *H04N 2201/0094* (2013.01)

(58) Field of Classification Search
  USPC ................ 358/409–413, 1.1–3.29, 1.11–1.18
  See application file for complete search history.

(56) References Cited

U.S. PATENT DOCUMENTS

| | | | | |
|---|---|---|---|---|
| 4,197,427 A * | 4/1980 | Hutcheson | ............... | H04Q 3/60 379/133 |
| 5,809,369 A * | 9/1998 | Furuya | ............... | G03G 15/2003 399/70 |
| 6,046,823 A * | 4/2000 | Chen | ......................... | G06F 1/22 358/1.9 |
| 2005/0216776 A1* | 9/2005 | Watanabe | ............. | G06F 1/3209 713/300 |
| 2010/0135682 A1* | 6/2010 | Nakajima | .......... | G03G 15/5008 399/50 |

FOREIGN PATENT DOCUMENTS

JP 2006172173 A 6/2006

* cited by examiner

*Primary Examiner* — Marcellus Augustin

(74) *Attorney, Agent, or Firm* — Rossi, Kimms & McDowell LLP

(57) ABSTRACT

An image forming apparatus that is capable of reducing unpleasant noise accompanying a preparation operation when a job without a print operation is performed. A second control unit controls an image forming unit. A plurality of lines connecting a first control unit and the second control unit include a first line for transmitting a clock to the second control unit from the first control unit, a second line for communicating a command including a start bit according to the clock, and a third line for controlling a state of the second control unit by the first control unit. The second control unit makes the image forming unit perform a preparation operation when the start bit is in a first state after releasing the sleep state, and makes the image forming unit not perform the preparation operation when the start bit is in a second state after releasing the sleep state.

6 Claims, 9 Drawing Sheets

| PIN NUMBER | SIGNAL NAME | DIRECTION |
|---|---|---|
| 1 | SCLK | OUTPUT |
| 2 | SDATA | INPUT/OUTPUT |
| 3 | SLEEP | OUTPUT |
| 4 | VDATA | OUTPUT |

IMAGE FORMING APPARATUS WITH POWER SAVING MODE

BACKGROUND OF THE INVENTION

Field of the Invention

The present invention relates to an image forming apparatus with a power saving mode.

Description of the Related Art

Image forming apparatuses include a single function printer (SFP) and a multifunction printer (MFP). The SFP is specialized in a printer function to form an image by an electrophotography process. The MFP is configured by combining an image reading unit etc. with an SFP.

Control boards of the SFP and MFP include a controller board that controls the entire apparatus and an engine board that controls a printer unit only. A CPU is mounted on each of the controller board and engine board. Then, the printer unit is controlled by a command from the controller board when the two CPUs communicate. Since the SFP and MFP are different in a function, the controller board of the SFP and the controller board of the MFP are different in a configuration. On the other hand, since specifications of the printer units are common in the SFP and MFP, it is preferable that the engine board of the SFP is also used as the engine board of the MFP from a point of view of cost reduction.

Japanese Laid-Open Patent Publication (Kokai) No. 2006-172173 (JP 2006-172173A) discloses a conventional technique about an SFP or an MFP that performs serial communication between a master processor equipped with a CPU and a slave processor. The technique disclosed in this publication supplies a strobe signal on serial communication to an input terminal of a clock monitoring means. The strobe signal is a synchronizing signal indicating start of communication or a synchronizing signal actively controlled during communication. The clock monitoring means is a means for monitoring a toggle operation at a certain interval, and is represented by a watchdog timer. Since the conventional technique gives two functions to the strobe signal by sharing the strobe signal with a clock for the watchdog timer, the number of signal lines is reduced.

Incidentally, the sleep mode is installed on an SFP and MFP in recent years. When a standby state of an apparatus continues for a long time, the apparatus automatically shifts to the sleep mode in which electric power is supplied only to the minimum units that include a controller board and is not supplied to the other units. The timing at which the mode is shifted to the sleep mode (hereinafter referred to as a "power saving mode") from the standby mode is set up by a user, for example.

When an SFP or an MFP performs a print job after turning power ON or releasing the power saving mode, a printer unit performs a multiple pre-rotating operation as a pre-process. The print job is performed after finishing the multiple pre-rotating operation as a preparation operation.

However, since the multiple pre-rotating operation drives the main driving units of the printer, operation sound is generated. Since a job of the SFP is limited to a print job, the multiple pre-rotating operation is certainly needed after releasing the sleep mode. However, jobs of the MFP include jobs without a print operation, such as a job that transmits an image read by an image read unit to a personal computer and a job for a facsimile transmission after releasing the sleep mode. Such a job does not need the multiple pre-rotating operation essentially. Accordingly, there is a problem that the operation sound of an unnecessary multiple pre-rotating operation becomes noise for a user in a case where the operation of the printer unit is not needed. Moreover, since an electric current is also supplied to a fixing device during the multiple pre-rotating operation, the multiple pre-rotating operation performed before a job without a print operation wastes energy.

In order to prevent an unnecessary multiple pre-rotating operation, it is preferable that the controller board transmits a control signal that controls the printer unit to perform or not to perform the multiple pre-rotating operation to the engine board after releasing the power saving mode. Such a control signal is called a WAKE signal. Then, when the WAKE signal transmitted after releasing the power saving mode is Low level, the printer unit does not perform the multiple pre-rotating operation. On the other hand, when it is High level, the printer unit performs the multiple pre-rotating operation. As a result of this, the engine board should check a logic of the WAKE signal when the power saving mode is released, and should select operation according to the logic.

However, implementation of the WAKE signal needs an output port for the controller board, needs an input port for the engine board, and needs to add a signal line to the interface that connects the controller board with the engine board.

SUMMARY OF THE INVENTION

The present invention provides an image forming apparatus that is capable of reducing unpleasant noise accompanying a preparation operation in case where a job without a print operation is performed after releasing the power saving mode without adding a signal line.

Accordingly, a first aspect of the present invention provides an image forming apparatus comprising an image forming unit, a first control unit, a second control unit configured to control the image forming unit, and a plurality of lines that connect the first control unit and the second control unit. The plurality of lines include a first line for transmitting a clock to the second control unit from the first control unit, a second line for communicating a command based on the clock between the first control unit and the second control unit, and a third line for controlling a state of the second control unit by the first control unit. The command is represented by a predetermined number of data synchronized with the clock, and the predetermined number of data has a start bit and command data that indicates a type of the command. The state of the second control unit includes a standby state and a sleep state of which power consumption is lower than the standby state. The second control unit makes the image forming unit perform a preparation operation for forming an image in a case where the start bit is in a first state after releasing the sleep state according to a state of the third line, and makes the image forming unit not perform the preparation operation in a case where the start bit is in a second state after releasing the sleep state according to the state of the third line.

According to the present invention, when the mode after releasing the power saving mode is a mode other than the mode for a print job, the unnecessary operation sound resulting from a preparation operation does not generate.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
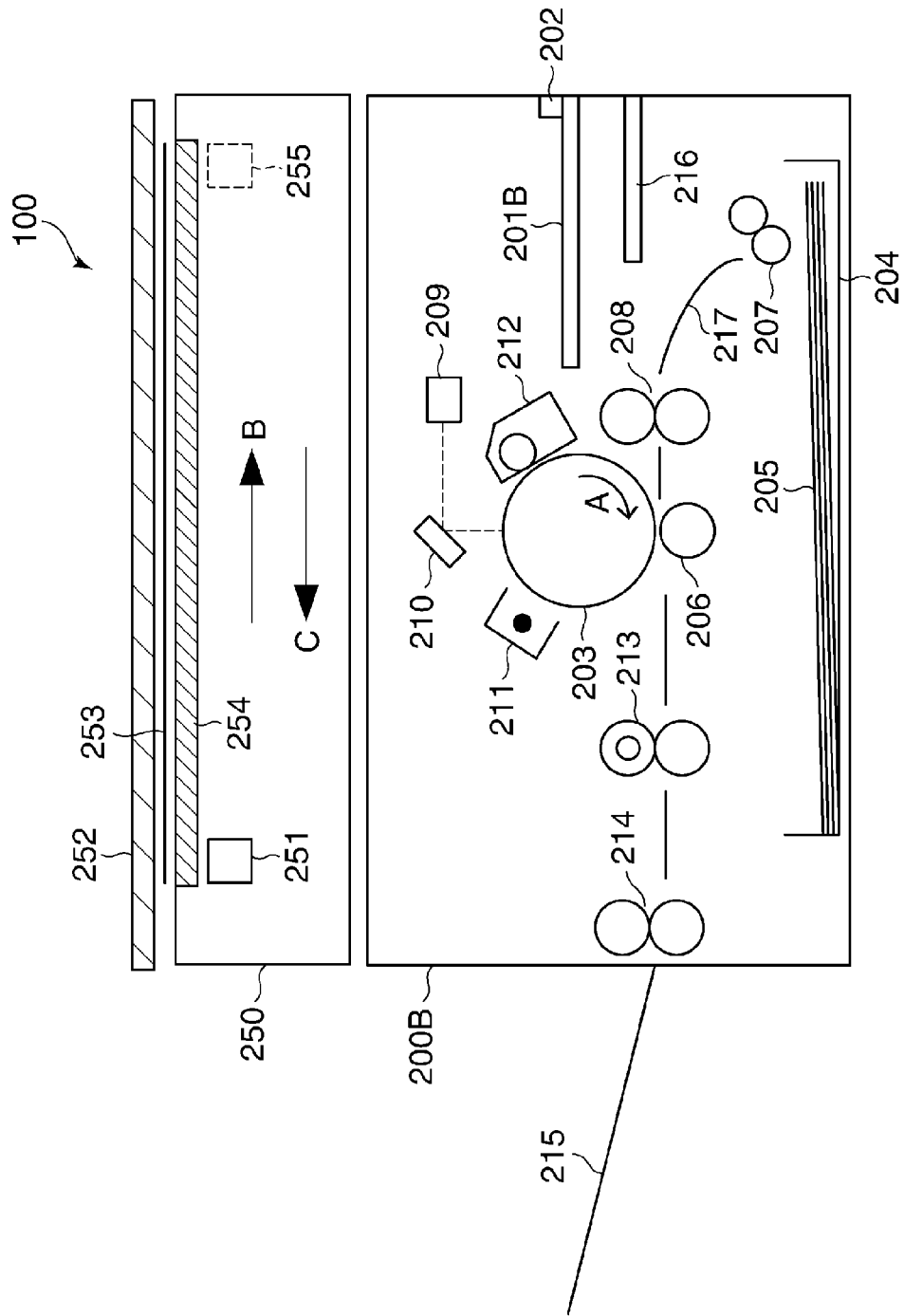
FIG. 1 is a sectional view schematically showing a configuration of a multifunctional printer (MFP) according to an embodiment of the present invention.

FIG. 1 is a sectional view schematically showing a configuration of a multifunctional printer (MFP) as an image forming apparatus according to an embodiment. The MFP 100 mainly consists of a printer unit 200B and an image reading unit 250 arranged on the top of the printer unit 200B.

As shown in FIG. 1, the image reading unit 250 is provided with a platen glass 254, a pressure plate 252 that gives pressure to an original 253 placed on the platen glass 254, and a contact image sensor (CIS) 251 arranged under the platen glass 254. The CIS 251 is connected with a controller board (a first control unit) 201B of the printer unit 200B through a flexible flat cable (FFC) that is not shown. The CIS 251 moves in directions of arrow B and C in FIG. 1.

The printer unit 200B is provided with a photosensitive drum 203 arranged in the center approximately. An electrostatic charger 211, a mirror 210, a laser scanner 209, and a development device 212 are arranged around the photosensitive drum 203. A transfer roller 206 is disposed so as to contact to and to be released from the photosensitive drum 203. A contact portion between the photosensitive drum 203 and transfer roller 206 becomes a transfer position. A fixing roller pair 213 and an ejecting roller pair 214 are arranged at the downstream side of the transfer position in a sheet conveyance direction.

A sheet cassette 204 is arranged under the photosensitive drum 203. Paper sheets 205 are stacked in the sheet cassette 204. There is a conveyance path 217 that conveys the paper sheets 205 stacked in the sheet cassette 204 to a sheet ejection tray 215 through the transfer position and a fixing unit. The conveyance path 217 is provided with a feeding roller pair 207 that takes up a paper sheet from the sheet cassette 204, and a registration roller pair 208 arranged at the upstream side of the transfer position.

Moreover, the printer unit 200B is provided with the controller board 201B and an engine board (a second control unit) 216. The controller board 201B has an interface (I/F) 202. The interface 202 is a general-purpose interface to which a personal computer (PC) that is not shown is connected. The interface 202 is a general USB interface, for example. The controller board 201B controls the entire image forming apparatus, i.e., the entire MFP 100. The engine board 216 specializes in control of the printer unit. The controller board 201B and the engine board 216 are connected via a cable (not shown), and the engine board 216 is controlled by the controller board 201B.

Figures 2, 3:
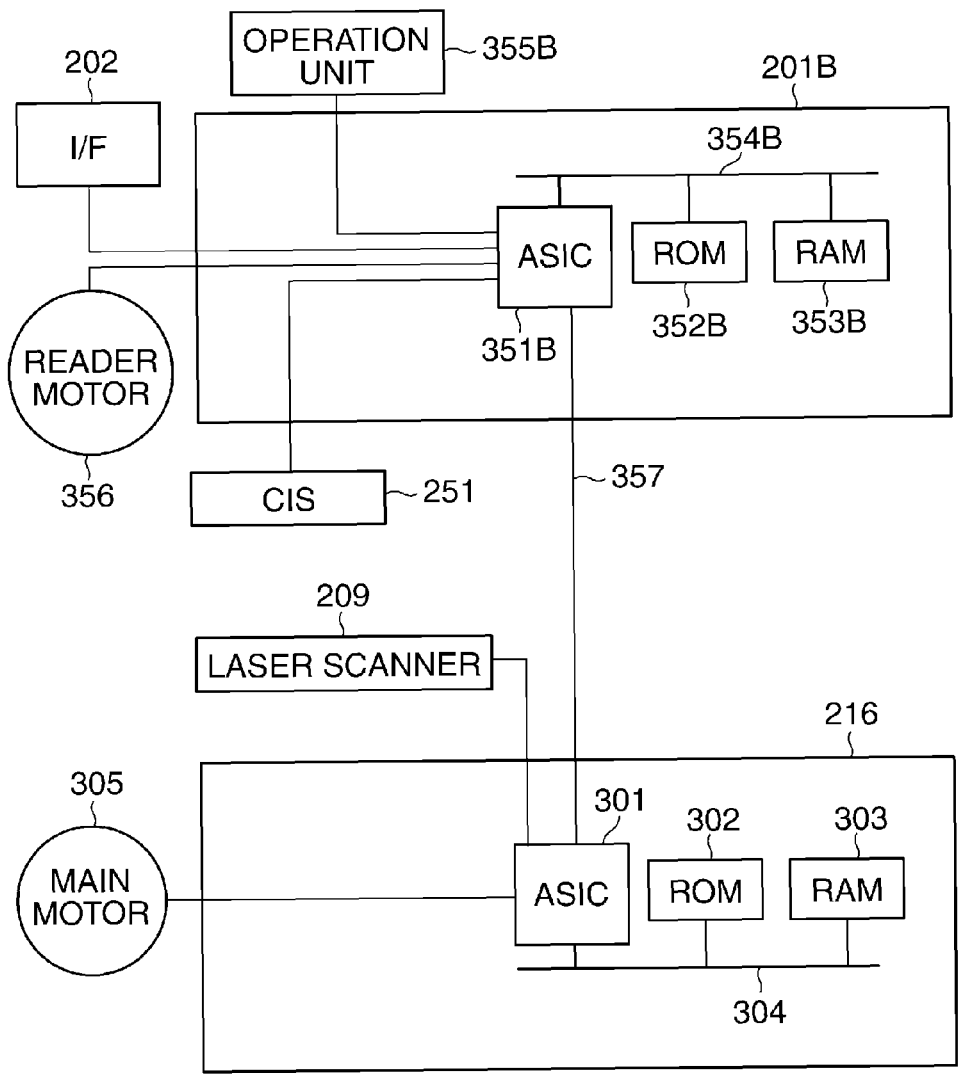
FIG. 2 is a block diagram schematically showing a control system of the multifunctional printer (MFP) shown in FIG. 1.
FIG. 3 is a view showing configurations of signal lines of an interface between a controller board and an engine board shown in FIG. 2.

Next, a control system of the MFP 100 shown in FIG. 1 will be described. FIG. 2 is a block diagram schematically showing the control system of the MFP 100 shown in FIG. 1.

The MFP 100 is provided with the controller board 201B and the engine board 216 as mentioned above.

The engine board 216 is provided with an ASIC 301. The ASIC 301 is an SOC (System On Chip) ASIC in which a CPU and logic circuit are built. The engine board 216 is provided with a ROM 302 and a RAM 303. The ASIC 301, ROM 302, and RAM 303 are connected through a system bus 304. The ROM 302 is a rewritable flash ROM that stores a control program that controls the ASIC 301. The ASIC 301 controls the printer unit 200B according to the control program stored in the ROM 302. The RAM 303 functions as a storage unit that temporarily saves data calculated by the ASIC 301 and that temporarily stores received image data etc.

The laser scanner 209 is connected to the ASIC 301. The laser scanner 209 generates a laser beam modulated according to image data to which an image process was applied, and forms an electrostatic latent image on the photosensitive drum 203 by scanning the photosensitive drum 203. A main motor 305 is connected to the ASIC 301. The main motor 305 drives driving members of the printer unit 200B through a drive system (not shown).

On the other hand, the controller board 201B is provided with an ASIC 351B. The ASIC 351B is an SOC ASIC in which a CPU and logic circuit are built. The controller board 201B is provided with a ROM 352B and a RAM 353B. The ASIC 351B, ROM 302, and RAM 303 are connected through a system bus 354B. The ROM 352B stores a control program that controls the ASIC 351B. The ASIC 351B controls the entire MFP 100 according to the control program stored in the ROM 352B. The RAM 353B functions as a storage unit that temporarily saves data calculated by the ASIC 351B and that temporarily stores data received from a connected personal computer (not shown).

An operation unit 355B is connected to the ASIC 351B. The ASIC 351B monitors an input state of an operation button mounted in the operation unit 355B, and displays a status of the apparatus and a comment to a user on a display unit like a built-in liquid crystal display (LCD) by controlling the operation unit 355B. The contact image sensor (CIS) 251 mounted in the image reading unit 250 and a reader motor 356 that drives the CIS 251 are connected to the ASIC 351B. Moreover, the I/F 202 for connecting a PC as an external device is connected to the ASIC 351B. An I/F 357 connects the ASIC 301 of the engine board 216 with the ASIC 351B of the controller board 201B.

FIG. 3 is a view showing configurations of signal lines of the I/F 357 that connects the controller board 201 and the engine board 216. The I/F 357 has four signal lines of pin numbers 1, 2, 3, and 4. The signal lines respectively transmit an SCLK (synchronous clock) signal, SDATA (serial data) signal, SLEEP signal, and VDATA signal.

The SCLK signal is a serial clock used when the ASIC 301 and ASIC 351B communicate, and is output from the controller board 201B. The SDATA signal is serial command data or status data transmitted when the ASIC 301 and ASIC 351B communicate, and is a bidirectional signal that both the ASIC 301 and ASIC 351B transmit and receive. That is, when the ASIC 351B transmits a command, the ASIC 351B becomes an output side and the ASIC 301 becomes an input side. On the other hand, when the ASIC 301 transmits a status, the ASIC 301 becomes an output side and the ASIC 351B becomes an input side.

When the ASIC 351B shifts the apparatus to a power saving mode (a sleep state), the SLEEP signal varies from High to Low. As a result of this, the power of the loads, such as the engine board 216, the laser scanner 209 and main motor 305 that are connected to the engine board 216, etc., is turned OFF, and the power consumption of the printer unit 200B becomes zero. When this signal varies from Low to High, the power of the engine board 216 is turned ON. When receiving the VDATA that is serial image data, the ASIC 301 performs a predetermined image process, transmits image data to the laser scanner 209, and prints an image on a sheet.

The MFP 100 of such a configuration has a copy mode in which an original image read by the image reading unit 250 is printed by the printer unit 200B. Moreover, the MFP 100 has a computer scan mode in which original image data read by the image reading unit 250 is transferred to a personal computer (PC) that is not shown and a print mode in which image data saved in the PC is output by the printer unit 200B.

Next, an operation of the image reading unit 250 of the MFP 100 will be described.

When a job like a copy operation or a computer scan operation is input to the image reading unit 250 according to a user's operation on the operation unit, the CIS 251 reads a line image in a principal scanning direction of the original 253 placed on the platen glass 254. A width direction of the original 253 at the read position is called the principal scanning direction, and a longitudinal direction of the original 253 that intersects perpendicularly with the principal scanning direction is called an auxiliary scanning direction.

At this time, the CIS 251 moves in the direction of the arrow B in FIG. 1 at a predetermined moving speed by the reader motor 356, while reading line images sequentially to read a desired original. A position of the CIS 251 indicated by a solid line in FIG. 1 is a home position that is a read position at which the front end of the original 253 is read. Moreover, a position 255 indicated by a broken line in FIG. 1 is a position of the CIS 251 at the time of the end of reading. After reading the original 253, the controller board 201B make the reader motor 356 counterrotate to move the CIS 251 in the direction of the arrow C in FIG. 1 to return the CIS 251 to the home position.

A fundamental resolution of the image reading apparatus 250 is 300 dpi (dot per inch) in both the principal scanning direction and auxiliary scanning direction, for example. The maximum original size applicable to the image reading apparatus 250 is an A4 size (297 mm in the principal scanning direction and 210 mm in the auxiliary scanning direction), for example. The moving speed of the CIS 251 is 100 mm/s in the case of 300 dpi in the principal and auxiliary directions, for example. Accordingly, an A4 sheet is read in 2.97 seconds in the case where the resolution is 300 dpi in the principal and auxiliary directions.

The read image data of the original 253 is transmitted to the printer unit 200B to print the image on the paper sheet 205 in the copy mode. Moreover, the image data is transferred to the connected PC (not shown) through the USB interface 202 in the computer scan mode in which the PC saves the image data as digital data.

Next, an operation of the printer unit 200 will be described.

For example, when the user sets up the print mode or the copy mode through the PC connected to the printer unit 200B, the feeding roller pair 207 of the printer unit 200B picks up the paper sheets 205 stacked in the sheet cassette 204 one by one and feeds them. The fed paper sheet 205 stops once after it is conveyed through the conveyance path 217 and contacts to the registration roller pair 208.

In the copy mode, the image data read by the image reading unit 250 is processed by the image processing unit implemented in the controller board 201B, and then the image data is transmitted to the laser scanner 209. The laser scanner 209 makes the laser beam modulated according to the image data scan the photosensitive drum 203 through the mirror 210. The photosensitive drum 203 is charged to a predetermined electrical potential by the electrostatic charger 211 and rotates in the direction of an arrow A in FIG. 1 at a predetermined rotating speed. An electrical potential of a position that the laser beam hits with the laser scanner 209 is discharged, which forms an electrostatic latent image on the photosensitive drum 203. The development device 212 makes toner adhere only to a charged position of the photosensitive drum 203 to form a toner image. At the timing at which the laser scanner 209 starts driving, conveyance of the paper sheet 205 that had stopped once is restarted and the paper sheet 205 is guided to the transfer position of the transfer roller 206 by the registration roller pair 208.

The toner image formed on the photosensitive drum 203 is transferred to the paper sheet 205 conveyed at the transfer position. The paper sheet 205 to which the toner image was transferred is guided to the fixing roller pair 213. In this place, the toner image transferred to the paper sheet 205 is heated and pressurized with the roller that is heated to a predetermined temperature beforehand, dissolves, and is fixed to the paper sheet 205. The sheet to which the toner image has been fixed is ejected to the sheet ejection tray 215 by the ejecting roller pair 214.

On the other hand, the image data that was input through the USB interface 202 is processed by the image processing unit implemented in the controller board 201B, and then, the image data is transmitted to the laser scanner 209 in the print mode. The laser scanner 209 makes the laser beam modulated according to the image data scan the photosensitive drum 203 through the mirror 210. The photosensitive drum 203 rotates in the direction of the arrow A in FIG. 1 at the predetermined rotating speed. And an electrostatic latent image is formed on the photosensitive drum 203 by the laser scanner 209 according to the input image data. The electrostatic latent image formed on the photosensitive drum 203 is developed by the development device 212 to form a toner image. After that, the same process as in the copy mode is performed, which gives a printed sheet finally.

Next, a job processing process performed with the MFP 100 in FIG. 1 will be described.

Figure 4:
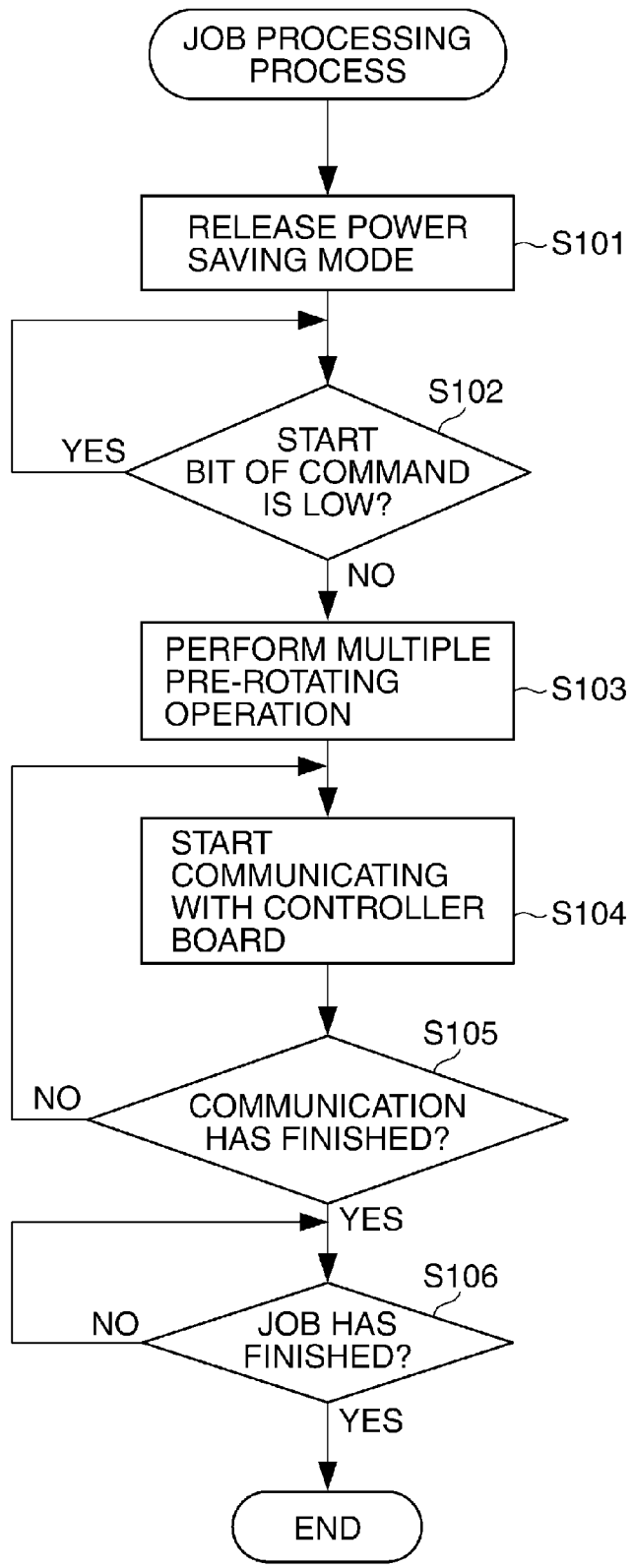
FIG. 4 is a flowchart showing procedures of a job processing process executed by the engine board of the MFP shown in FIG. 1.

FIG. 4 is a flowchart showing procedures of the job processing process executed by the engine board 216 of the MFP 100 shown in FIG. 1. The ASIC 301 of the engine board 216 performs the job processing process according to a job processing program stored in the ROM 302.

As shown in FIG. 4, the ASIC 301 releases the power saving mode first in response to a command received from the ASIC 351B of the controller board 201B (step S101). When the power saving mode is released, electric power is supplied to the engine board 216 by the command from the ASIC 351B.

Incidentally, when a user presses a power saving button 907 (FIG. 5) that is provided in the operation unit 355B as mentioned later, the MFP 100 shifts to the power saving mode. Moreover, it is also controllable to shift to the power saving mode, when a predetermined time period elapses in a standby mode (a standby state) after the MFP 100 shifted to the standby mode. For example, it is set up so as to shift to the power saving mode from the standby mode when five minutes have passed after shifting to the standby mode.

Hereinafter, the operation unit used when setting up the power saving mode etc. will be described.

Figure 5A:
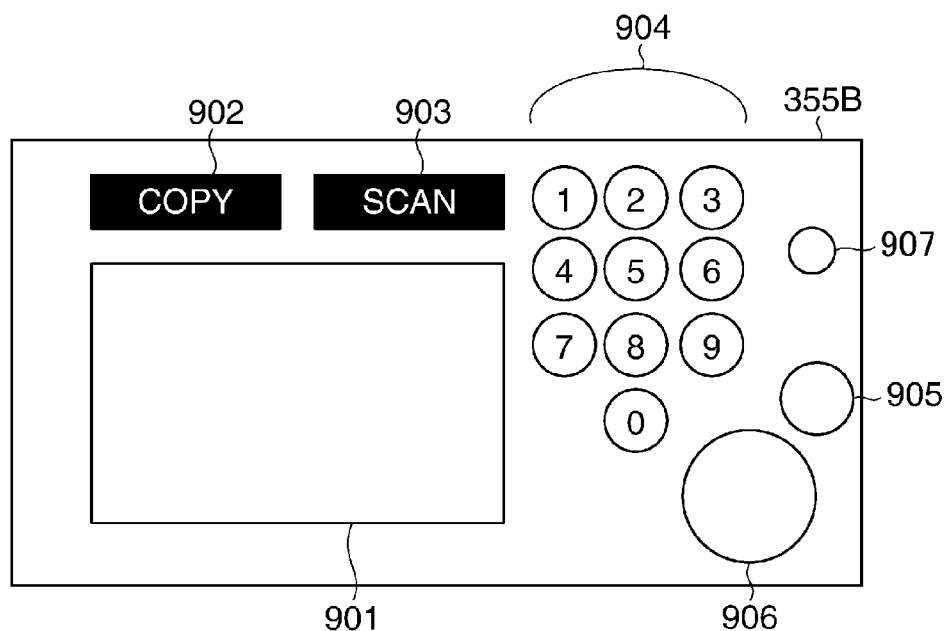
FIG. 5A is a view showing a configuration of an operation unit that is connected to an ASIC of the controller board.
Figure 5B:
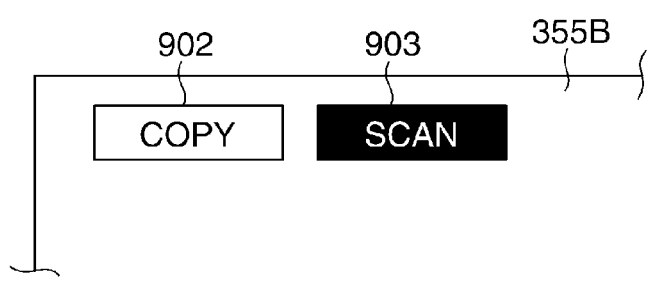
FIG. 5B and FIG. 5C are views for describing a function of the operation unit shown in FIG. 5A.
Figure 5C:
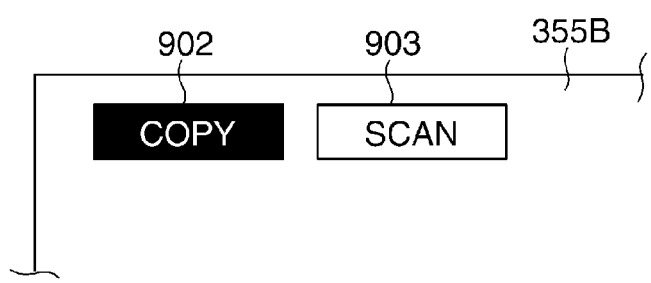

FIG. 5A is a view showing a configuration of the operation unit 355B that is connected to the ASIC 351B of the controller board 201B. FIG. 5B and FIG. 5C are views for describing a function of the operation unit 355B shown in FIG. 5A.

As shown in FIG. 5A, the operation unit 355B is provided with an LCD 901, a copy button 902, a scan button 903, a ten-key pad 904, an interruption key 905, a start button 906, and the power saving button 907. The LCD 901 is a display unit that displays a state of the MFP 100 and informs a user of the state, for example. The copy button 902 is pressed when the user selects the copy mode. An LED (not shown) is provided inside the copy button 902. When the copy button 902 is pressed, the LED glows to inform the user that the copy mode has been selected as shown in FIG. 5B.

The scan button 903 is pressed when the user selects the computer scan mode. An LED (not shown) is provided inside the scan button 903 as with the copy button 902. When the scan button 903 is pressed, the LED glows to inform the user that the computer scan mode has been selected as shown in FIG. 5C. The ten-key pad 904 is a keyboard that is used when the user inputs the number of copies in the copy mode, for example. The input number is displayed on the LCD 901. The interruption key 905 is pressed when the user interrupts an operation of the apparatus. When this button is pressed, the active operation in the MFP 100 is interrupted.

When the start button 906 is pressed in the state where the copy mode is selected, the MFP 100 reads the original with the image reading unit 250 and prints the image with the printer unit 200B. Moreover, when the start button 906 is pressed in the state where the computer scan mode is selected, the MFP 100 reads the original with the image reading unit 250 and transmits the image data to the PC (not show) connected to the MFP 100.

The power saving button 907 is used to switch the mode of the MFP 100 between the power saving mode and standby mode. When the power saving button 907 is pressed in the standby mode, the MFP 100 shifts to the power saving mode from the standby mode. When the power saving button 907 is pressed in the power saving mode, the MFP 100 shifts to the standby mode from the power saving mode.

Referring back to FIG. 4, after releasing the power saving mode, the ASIC 301 detects a start bit of a first command in communication with the ASIC 351B, and determines whether the start bit is Low (step S102).

Figure 6:
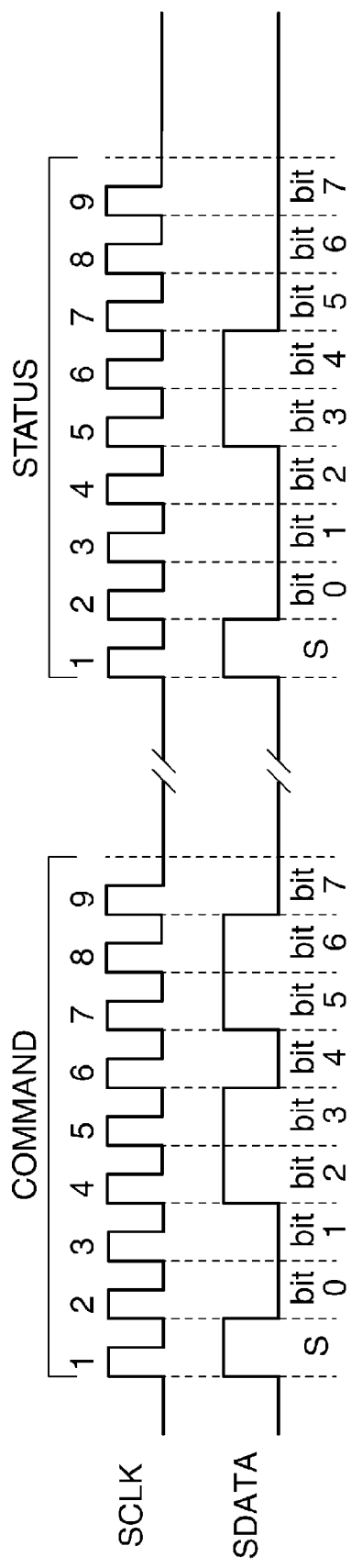
FIG. 6 is a timing chart showing timings of issuing a command and status among interface signals in serial communication between the controller board and engine board shown in FIG. 2.

FIG. 6 is a timing chart showing timings of issuing a command and status among interface signals in serial communication between the controller board (a first board) 201B and engine board (a second board) 216.

As shown in FIG. 6, the ASIC 351B of the controller board 201B outputs nine clocks as the SCLK signal periodically to the ASIC 301. Synchronizing therewith, the ASIC 351B issues a command to the ASIC 301 as the SDATA signal. When issuing the command, the ASIC 351B outputs the SDATA signal and the ASIC 301 is set as the input side.

The SDATA signal that is synchronized with the first clock of the SCLK signal is the start bit S. When the ASIC 301 detects High at the rise of the first clock of the SCLK signal, it means that the command was issued and that the serial clock is operating. The SDATA signal that is synchronized with the second to ninth clocks of the SCLK signal is an eight-bit command data that is transmitted, and is transmitted in order from the least significant bit to the most significant bit. In the example in FIG. 6, the command data indicates "01101100 (6Ch)".

When receiving the nine clocks of the SCLK signal, the ASIC 301 is set as the output side of the SDATA signal. Moreover, when transmitting the nine clocks of the SCLK signal, the ASIC 351B is set as the input side of the SDATA signal. The SDATA signal that is synchronized with the first clock of the SCLK signal just after issuing the command is the start bit S. When the ASIC 351B detects High at the rise of the first clock of the SCLK signal, it means that the status was issued. When Low is detected at the rise of the first clock of the SCLK signal, it means that the ASIC 301 is not ready to return a status, and the ASIC 351B outputs the SCLK signal periodically until the start bit becomes High. In this embodiment, when the start bit does not become High even if five-sets of clocks were transmitted, it is determined as a communication error. In this case, the PC as an external device or the display unit of the operation unit 355B outputs an error message that indicates an occurrence of an error (failure).

The example in FIG. 6 shows what the ASIC 301 issued the status data of "00011000 (18h)" following High of the start bit. When receiving the status data, the ASIC 351B is set as the output side of the SDATA signal. When transmitting the status data, the ASIC 301 is set as the input side of the SDATA signal to prepare for the next command issue. Processes to respective data of the command and status are predetermined. As a result of this, the apparatus is controlled comprehensively.

Referring back to FIG. 4, as a result of the determination in the step S102, when the start bit of the command is Low, ("YES" in the step S102), the ASIC 301 waits until the start bit becomes High. On the other hand, when the start bit is High ("NO" in the step S102), the ASIC 301 performs a multiple pre-rotating operation that is a preparation operation in advance of a print job or a copy job (step S103). The multiple pre-rotating operation is performed for stabilizing the states of the units relevant to the electrophotography process before starting a print job or a copy job by preheating the fixing device, charging the photosensitive drum, and rotating the photosensitive drum.

After performing the multiple pre-rotating operation (step S103), the ASIC 301 proceeds with the process to step S104. That is, the ASIC 301 starts communicating with the ASIC 251B, controls the operation of the printer unit 200B according to the received command, and transmits the status to the ASIC 251B (step S104). After transmitting the status to the ASIC 251B, the ASIC 301 determines whether the communication with the ASIC 351B has finished (step S105).

As a result of the determination in the step S105, when the communication with the ASIC 351B has finished ("YES" in the step S105), the ASIC 301 proceeds with the process to step S106. That is, the ASIC 301 determines whether the operation to the last command has finished (i.e., a series of jobs have finished), and waits until the jobs finish (step S106). Then, after finishing the series of jobs, the ASIC 301 finishes this job processing process.

On the other hand, as a result of the determination in the step S105, when the communication with the ASIC 351B has not finished ("NO" in the step S105), the ASIC 301 returns the process to the step S104, and continues exchanging a command and status with the ASIC 351B.

Next, a job processing process performed with the controller board 201B of the MFP 100 1 will be described.

Figure 7:
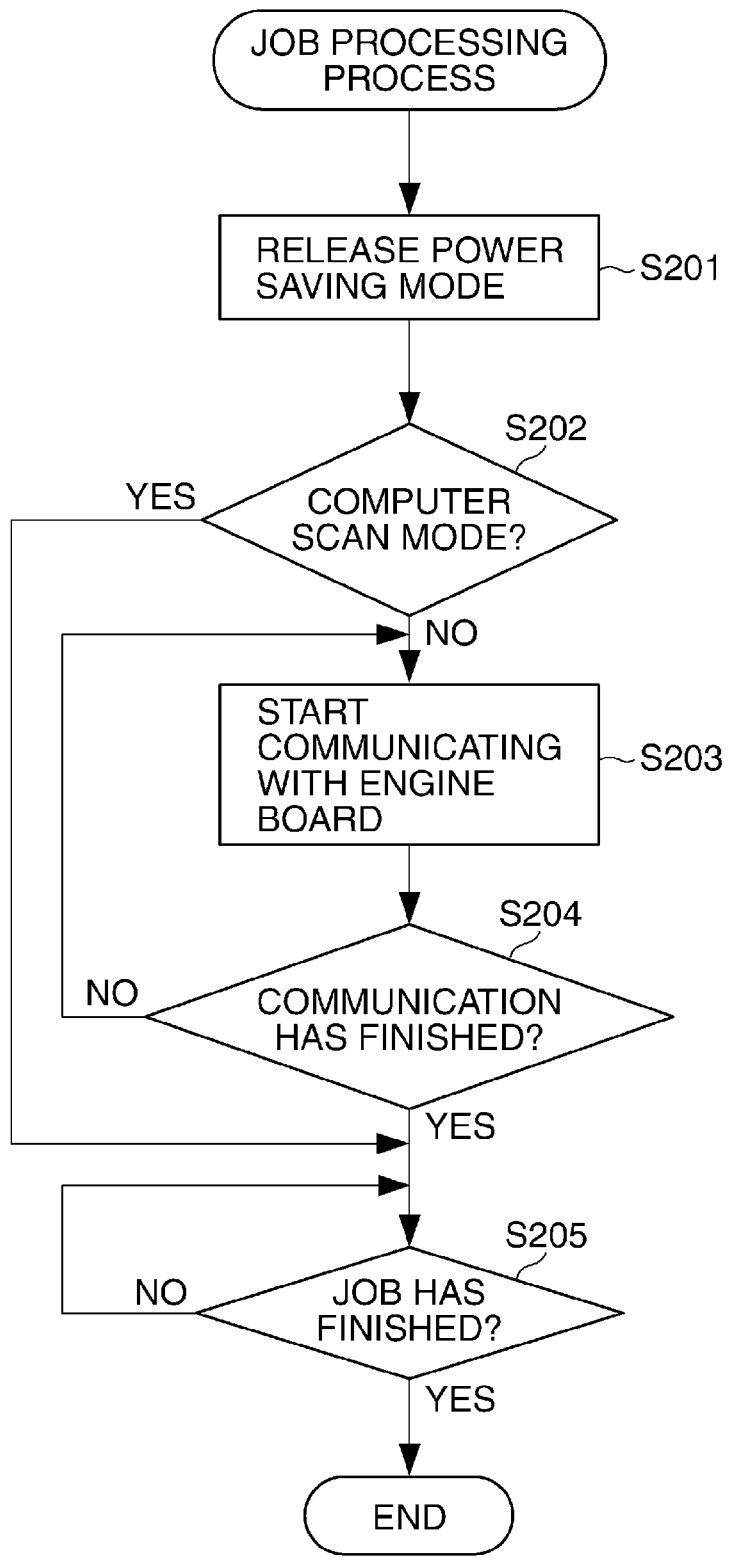
FIG. 7 is a flowchart showing procedures of a job processing process executed by the controller board of the MFP shown in FIG. 1.

FIG. 7 is a flowchart showing procedures of the job processing process executed by the controller board 201B of the MFP 100 shown in FIG. 1. The ASIC 351B performs the job processing process according to a job processing program stored in the ROM 352 of the controller board 201B when the engine board 216 performs the job processing process in FIG. 4.

As shown in FIG. 7, the ASIC 351B first changes the SLEEP signal to High from Low to release the power saving mode of the engine board 216, and supplies electric power to the engine board 216 (step S201). After supplying the electric power to the engine board 216, the ASIC 351B determines whether the computer scan mode was selected by the user (step S202). The computer scan mode is a mode in which an original image data scanned is transmitted to a personal computer (PC) connected through the interface 202, for example, and is the mode without an image forming operation.

As a result of the determination in the step S202, when the computer scan mode was not selected ("NO" in the step S202), the ASIC 351B proceeds with the process to the step S203. That is, the ASIC 351B starts communicating with the ASIC 301, and transmits the command corresponding to the received status to the ASIC 301 (step S203). It should be noted that the ASIC 301 makes the multiple pre-rotating operation perform as the pre-process of the image forming operation (see the above-mentioned step S103 in FIG. 4).

Next, the ASIC 351B determines whether the communication with the ASIC 351B has finished (step S204). As a result of the determination in the step S204, when the communication with the ASIC 301 has finished ("YES" in the step S204), the ASIC 351B determines whether the series of jobs have finished (step S205), and waits until the final job finishes. Then, when the series of jobs have finished ("YES" in the step S205), the ASIC 351B finishes this process.

On the other hand, as a result of the determination in the step S204, when the communication with the ASIC 351B has not finished ("NO" in the step S204), the ASIC 351B returns the process to the step S203, and continues exchanging a command and status with the ASIC 301.

Moreover, as a result of the determination in the step S202, when the computer scan mode was not selected ("NO" in the step S202), the ASIC 351B proceeds with the process to the step S205.

A computer scan job does not need an operation of the printer unit 200B. Accordingly, the multiple pre-rotating operation immediately after releasing the power saving mode becomes unnecessary in this case.

Figure 8:
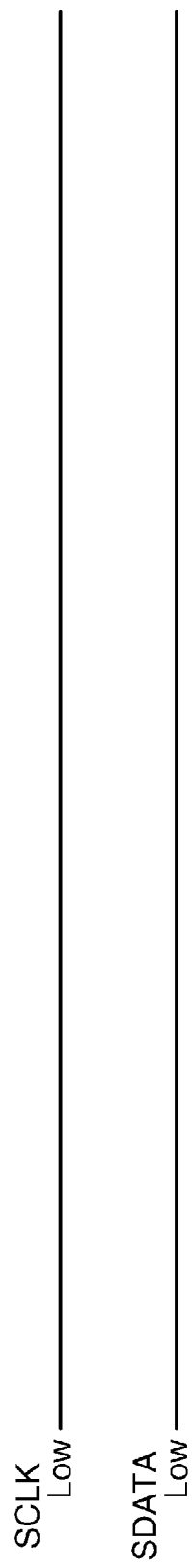
FIG. 8 is a timing chart showing timings of issuing a command and status in a case where a multiple pre-rotation is not performed in the MFP shown in FIG. 1.

Moreover, the ASIC 351B fixes the SCLK (serial clock) signal on the I/F 357 to Low in the computer scan job immediately after releasing the power saving mode, as shown in FIG. 8. Accordingly, since the ASIC 301 of the engine board 216 does not detect a start bit, the ASIC 301 does not perform the multiple pre-rotating operation.

When the SCLK signal is fixed to Low and the controller board 201B does not communicate with the engine board 216, the controller board 201B cannot control the engine board 216 and cannot determine an error of the printer unit 200B. However, since the computer print job does not use the printer unit 200B, an error of the printer unit 200B does not become a problem promptly. Then, when a job with a print operation occurs, the exchange of a command and status starts. And when the controller board 201B receives an error of the printer unit 200B, it displays the occurrence of the error on the LCD 901 of the operation unit 355B. This enables to inform the user of the error in response to the occurrence of the error in the printer unit 200B, which simplifies an error detection algorithm.

The MFP 100 is controlled so as to shift to the power saving mode again when 5 minutes elapses after finishing the computer scan job, for example. Moreover, when a print job or a copy job is again input before shifting to the power saving mode, the exchange of a command and status starts like in FIG. 6.

According to the processes in FIG. 4 and FIG. 7, it is determined whether the mode after releasing the power saving mode needs a print operation (the steps S102 and S202). And when the mode does not need a print operation ("YES" in the step S202), the multiple pre-rotating operation is not performed. As a result of this, displeasure due to an unnecessary operation sound is not given to a user when the mode after releasing the power saving mode does not need the print operation.

Moreover, since an exclusive line through which the controller board 201B notifies the engine board 216 of whether the multiple pre-rotating operation will be performed is unnecessary according to the embodiment, the cost of the apparatus is reduced.

Moreover, since the engine board of the MFP can be used as the engine board of the SFP according to the embodiment, the cost is reduced due to volume efficiency. Hereinafter, it will be described that the same engine board can be shared among the MFP and a single function printer (SFP).

Figure 9:
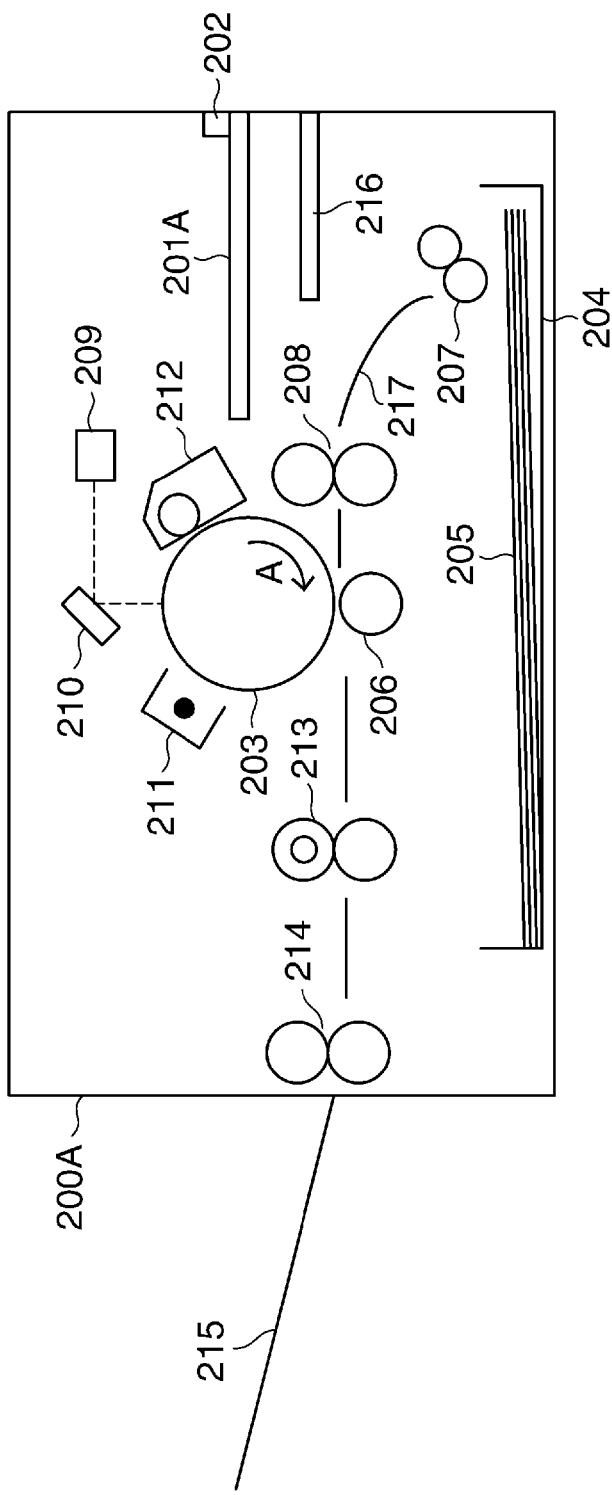
FIG. 9 is a sectional view schematically showing a configuration of a single function printer (SFP).

FIG. 9 is a sectional view schematically showing a configuration of an SFP. As mentioned above, the SFP has only the printer function, receives image data from a connected personal computer, and prints the received image data.

As shown in FIG. 9, the configuration of the SFP 200A is almost the same as that of the printer unit 200B of the MFP 100 in FIG. 1 mentioned above, and a function and performance are the same. Accordingly, description about the SFP 200A is omitted. Although the controller board is denoted by the reference numeral 201B in FIG. 1, a controller board is denoted by the reference numeral 201A in FIG. 9.

Figure 10:
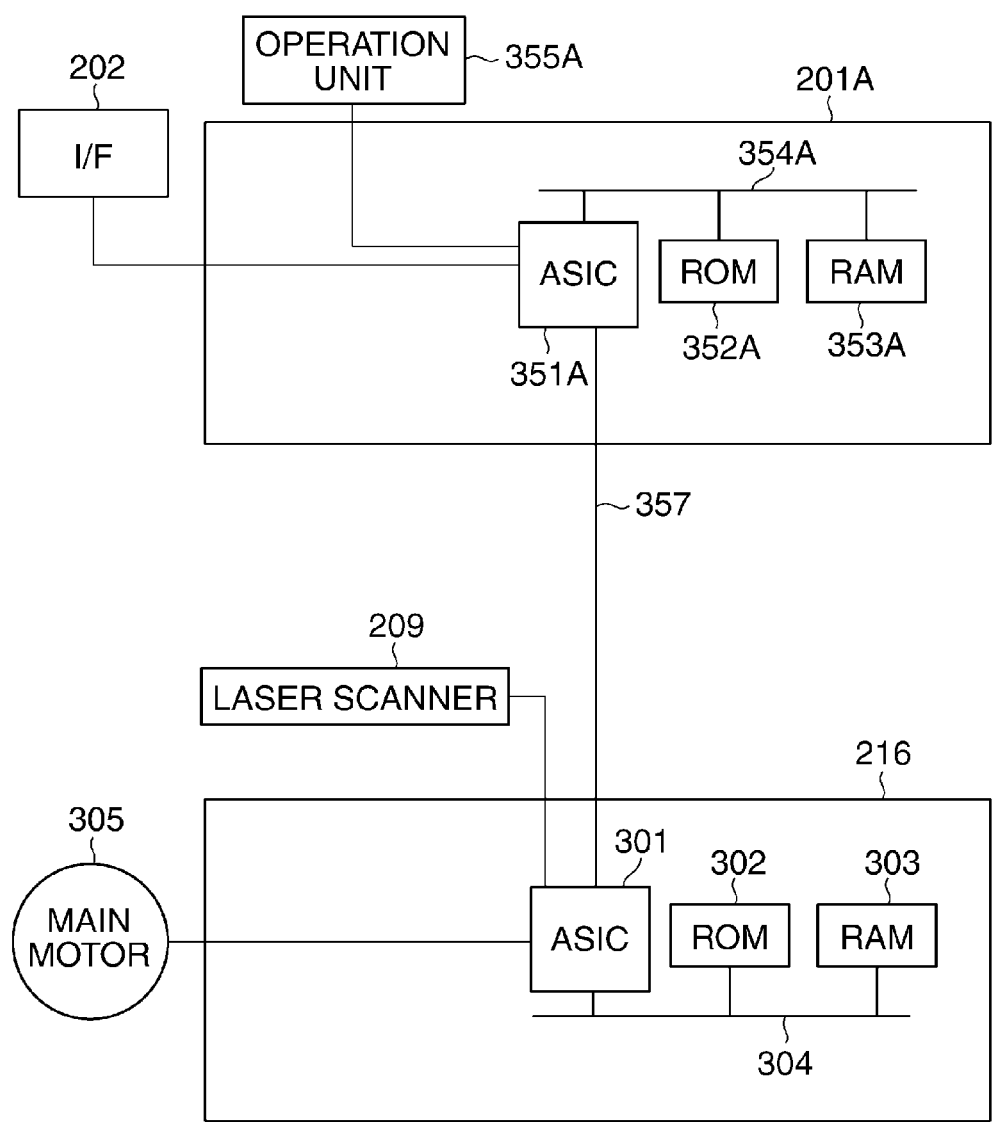
FIG. 10 is a block diagram showing a control system of the single function printer (SFP) shown in FIG. 9.

Next, a control system of the SFP 200A will be described. FIG. 10 is a block diagram schematically showing the control system of the SFP 200A shown in FIG. 9. In FIG. 10, the same reference numerals are given to the same members as that in FIG. 2.

As shown in FIG. 10, although the configuration of the controller board 201A is the same as that of the controller board 201B of the MFP 100, the CIS 251 and the reader motor 356 that drives the CIS 251 are not connected to the controller board 201A. Moreover, since the SFP does not have functions of copy and scan, the number of input keys of an operation unit 355A is less than that of the operation unit 355B of the MFP 100, and an operation area of the operation unit 355A is smaller than that of the operation unit 355B.

Moreover, processing power of an ASIC 351A is lower than the ASIC 351B of the MFP 100, and capacities of a ROM 352A and a RAM 353A are respectively lower than the capacities of the ROM 352B and the RAM 353B of the MFP 100. Moreover, a bus width of a system bus 354A is narrower than that of the system bus 354B of the MFP 100. For example, while the data bus and address bus of the system bus 354B of the MFP 100 are respectively 16 bits and 12 bits, the data bus and address bus of the system bus 354A are respectively 8 bits and 10 bits.

Moreover, the configuration of the engine board 216 is the same as that of the engine board 216 of the MFP 100. This enables to share the engine board of the same configuration. Accordingly, a configuration of an I/F 357 of the SFP 200A is the same as the I/F 357 of the MFP 100, and signals constituting the I/F are the same as the signals shown in FIG. 3. The engine unit 216 of the SFP 200A is controlled in the same manner as the engine unit 200B of the MFP 100. However, since the SFP 200A has only a printer function, the SCLK signal and SDATA signal do not show the states shown in FIG. 8 that represent that the multiple pre-rotating operation is unnecessary.

Moreover, when the engine board 216 of the SFP 200A is shared with the MFP 100, a checking step corresponding to the step S102 in FIG. 4 that is essentially unnecessary to the SFP is added. The cost does not increase because the increase in program capacity is a little, and the cost is reduced due to volume efficiency of sharing.

Moreover, the above mentioned serial data includes a start bit showing that the ASIC 351A issues data. When the ASIC 301 does not detect the start bit, the ASIC 301 determines that the synchronous clock is stopped. Accordingly, since the engine board does not need to arrange another input port that determines the logic of the clock other than the input port through which the clock is input, the resource of the port is utilizable effectively.

Furthermore, the ASIC 351B of the MFP 100 does not check an error of the printer unit when the ASIC 351A does not transmit the synchronous clock to the ASIC 301. As a result of this, even if an error has occurred in the engine unit, the error is not detected and a job without the print operation is performed.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-251621, filed Dec. 24, 2015, which is hereby incorporated by reference herein in its entirety.

What is claimed is:

1. An image forming apparatus comprising:
an image forming unit;
a first control unit;
a second control unit configured to control said image forming unit; and
a plurality of lines that connect said first control unit and said second control unit,
wherein said plurality of lines include a first line for transmitting a clock to said second control unit from said first control unit, a second line for communicating a command according to the clock between said first control unit and said second control unit, and a third line for controlling a state of said second control unit by said first control unit,
wherein the command is represented by a predetermined number of data synchronized with the clock, and the predetermined number of data has a start bit and command data that indicates a type of the command,
wherein the state of said second control unit includes a standby state and a sleep state of which power consumption is lower than the standby state,
wherein said second control unit makes said image forming unit perform a preparation operation for forming an image in a case where the start bit is in a first state after releasing the sleep state according to a state of the third line, and makes said image forming unit not perform the preparation operation in a case where the start bit is in a second state after releasing the sleep state according to the state of the third line.

2. The image forming apparatus according to claim 1, wherein said second control unit makes said image forming unit perform the preparation operation in advance of an image formation in a case where the clock is operating, and makes said image forming unit not perform the preparation operation in a case where the clock is stopped.

3. The image forming apparatus according to claim 1, wherein said first control unit does not transmit the clock to said second control unit in a case where a job that the image forming apparatus will perform is a job without an image forming operation.

4. The image forming apparatus according to claim 3, wherein said first control unit does not perform determination of an error of said image forming unit in a case where said first control unit does not transmit the clock to said second control unit.

5. The image forming apparatus according to claim 1, wherein the command includes image data.

6. The image forming apparatus according to claim 1, wherein the image forming apparatus is a multifunction printer, and said second control unit is configured to be identical to a control unit of a single function printer.

* * * * *